(No Model.)

S. B. DOVER.
RAPIDLY ADJUSTABLE NUT FOR CALIPERS.

No. 267,166. Patented Nov. 7, 1882.

Witnesses.
Robert Everett,
J. A. Rutherford

Inventor.
Samuel B. Dover.
By James L. Norris.
Atty.

UNITED STATES PATENT OFFICE.

SAMUEL B. DOVER, OF DAYTON, OHIO.

RAPIDLY-ADJUSTABLE NUT FOR CALIPERS.

SPECIFICATION forming part of Letters Patent No. 267,166, dated November 7, 1882.

Application filed March 7, 1882. (No model.)

*To all whom it may concern:*

Be it known that I, SAMUEL BEST DOVER, of the city of Dayton, of the county of Montgomery and State of Ohio, have invented a new and useful rapid adjusting nut for calipers, mongrels, dividers, drafting-instruments, wrenches, and similar instruments and articles, which invention is fully set forth in the following specification, reference being had to the accompanying drawings.

This invention relates to that class of spring-calipers or analogous instruments in which the legs or jaws are expanded by means of a spring, and the extent to which they are opened regulated by a device adjustably fitted upon a rod which connects with one leg or jaw and passes through an opening in the other.

Heretofore several devices have been provided for limiting the expansion of the legs. One of these consists of a thumb-nut arranged upon the screw-threaded rod which passes through one leg and is attached to the remaining leg. In another instance a split nut having its two halves connected together by springs has been arranged upon the screw-threaded rod, and a cup-shaped collar fitted upon the screw between said nut and the leg through which the rod passes, so that when the collar is forced by the leg over the inner end of the nut the latter will be clamped upon the screw-threaded rod. In another instance a nut split at one end has been fitted upon the screw-threaded rod and a concave or cup-shaped collar arranged in said rod between the nut and the leg through which the rod passes, whereby when the legs are sprung apart the washer will be forced upon the conical split end of the nut, so as to cause the nut to bind upon the rod.

In carrying out my invention I provide upon the rod, which is attached to one leg and passed through the remaining leg, a nut or sleeve having one or more pivoted jaws, and upon said rod, between the leg and nut or sleeve, arrange a loose collar, which, when forced by the leg between the inner ends of the jaws, causes their outer gripping ends to bind upon the rod, and thus prevent the nut or sleeve from slipping.

Figure 1:
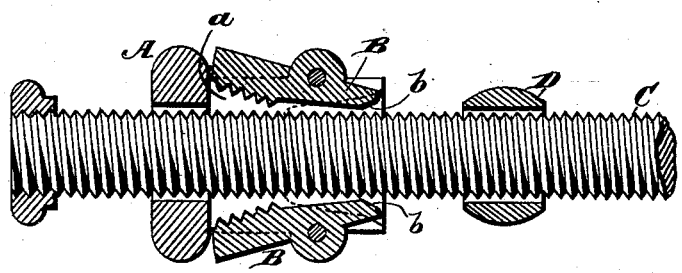
Figures 2, 3:
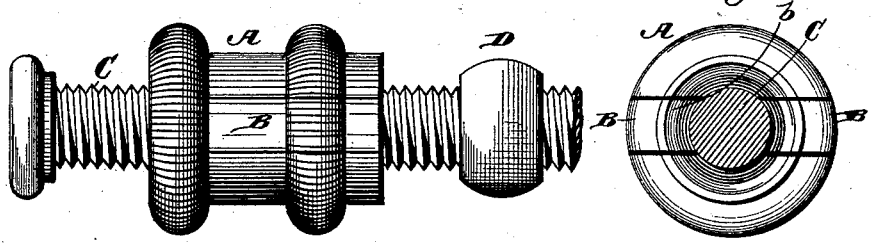
Figure 4:
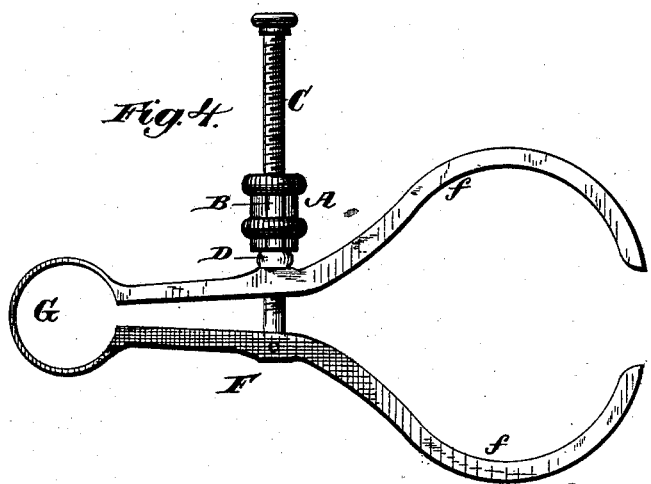

In the drawings, Figure 1 represents in section my improved attachment for spring-calipers. Fig. 2 is a side view of the same, and Fig. 3 an end view, the said attachment in these three views being arranged upon the rod, which is designed to be connected with one leg and passed through an opening in the remaining leg of the calipers. Fig. 4 represents a pair of ordinary spring-calipers with my improved attachment shown on a reduced scale.

A indicates a sleeve adapted to slide upon the rod, which is pivoted to one leg and extended through an opening in the other leg of the calipers. This sleeve is provided with a pair of longitudinal slots, $a$, in each of which is pivoted a jaw, B, so formed that when the jaws are parallel with the axis of the rod C, upon which the sleeve is arranged to slide, the sleeve can slide freely upon said rod. These jaws are preferably serrated at their outer or clamping ends, so that when the rod C is screw-threaded and the jaw operated so as to bind thereon its serrated face will engage the thread of the rod, and thereby effectually prevent the sleeve from slipping. The inner end or shank portions of these jaws are beveled on their inner sides, as at $b$, Fig. 1, and the sleeve at this end has its bore considerably enlarged, whereby, when a small collar, D, arranged to slide upon the rod, is pressed into the end of the sleeve and wedged between the shanks of the jaws, the said shanks will be forced apart and the jaws proper moved toward each other and clamped upon the rod. This collar D is arranged upon the rod between the sleeve A and one of the legs of the calipers through which the rod passes. The spring-calipers F (shown in Fig. 4) are of ordinary construction, their legs $f$ being connected at their upper ends by means of a spring, G, and the rod C being pivoted to one leg and extended laterally through an opening in the remaining leg.

In using the calipers provided with this attachment the sleeve is slipped to the proper point on rod C and the caliper-legs allowed to expand. The leg through which the rod passes will move the collar D along said rod and force it into the end of the sleeve, thereby causing the collar to operate the jaws and cause them to firmly grip the rod.

It will be obvious that this attachment could be applied to other tools—as, for example, certain kinds of wrenches or pinchers. One, two, or more of these jaws can be employed, although two will be the preferred number. The sliding sleeve is preferably provided with annular milled flanges, so that it can be conveniently manipulated when it is desired to open or close the calipers.

Having thus described my invention, what I claim is—

1. An attachment for spring-calipers or analogous tools, consisting of a sleeve provided with pivoted jaws and fitted to slide upon the rod which is connected with one leg of the calipers and extended through the remaining leg, and a collar loosely fitted upon said rod and adapted to wedge between the shanks of the jaws when the caliper-legs are opened, so as to cause the jaws to grip the rod, substantially as described.

2. The combination, with a pair of spring-calipers, of the longitudinally-slotted sleeve fitted to slide upon the rod which is connected with one leg and extended through the remaining leg of the calipers, the jaws pivoted in the slots of the sleeve, and a collar slidably arranged upon the rod between the sleeve and one of the caliper-legs, said collar being adapted to wedge between the shank portions of the jaws when the legs are expanded, and to thereby cause the jaws to grip the rod and prevent the collar from sliding thereon, substantially as described.

3. The combination, with a pair of spring-calipers or analogous instrument, of the longitudinally-slotted sleeve fitted to slide upon rod C, and provided with jaws B, pivoted in its slots, of the collar D, adapted to enter the inner end of the sleeve, which has its bore enlarged at such end, and to force outwardly the shank ends of the jaws, whereby their clamping ends will be clamped upon the rod, substantially as described.

SAML. B. DOVER.

Witnesses:
WILLIAM KRECHZSCH,
G. BERGMANN.